US009599484B2

(12) United States Patent
Bostick et al.

(10) Patent No.: US 9,599,484 B2
(45) Date of Patent: Mar. 21, 2017

(54) SOCIAL MEDIA BASED WEIGHTED ROUTE SELECTION

(71) Applicant: International Business Machines Corporation, Armonk, NY (US)

(72) Inventors: James E. Bostick, Austin, TX (US); John M. Ganci, Jr., Cary, NC (US); Sarbajit K. Rakshit, Kolkata (IN); Craig M. Trim, Sylmar, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 117 days.

(21) Appl. No.: 14/536,848

(22) Filed: Nov. 10, 2014

(65) Prior Publication Data
US 2016/0131493 A1 May 12, 2016

(51) Int. Cl.
*G01C 21/34* (2006.01)
(52) U.S. Cl.
CPC ..... *G01C 21/3476* (2013.01); *G01C 21/3484* (2013.01); *G01C 21/3453* (2013.01)
(58) Field of Classification Search
CPC ............ G01C 21/3476; G01C 21/3453; G01C 21/3484
USPC ........................................................ 701/537
See application file for complete search history.

(56) References Cited

U.S. PATENT DOCUMENTS

| 5,470,233 | A | * | 11/1995 | Fruchterman | .... G08G 1/096861 340/4.14 |
| 6,401,034 | B1 | * | 6/2002 | Kaplan | ................ G08G 1/0962 701/300 |
| 6,587,785 | B2 | * | 7/2003 | Jijina | ................. G01C 21/3415 701/117 |
| 7,698,062 | B1 | * | 4/2010 | McMullen | ............. G01C 21/20 342/357.31 |

(Continued)

FOREIGN PATENT DOCUMENTS

| CN | 103310701 A | 9/2013 |
| WO | 2013134863 A1 | 9/2013 |

OTHER PUBLICATIONS

Schaffert et al; KiWi { A Platform for Semantic Social Software (Demonstration), AN-11027713; 2009.

(Continued)

*Primary Examiner* — Courtney Heinle
*Assistant Examiner* — Angelina Shudy
(74) *Attorney, Agent, or Firm* — Garg Law Firm, PLLC; Rakesh Garg; Christopher K. McLane

(57) ABSTRACT

A method, system, and computer program product for social media based weighted route selection are provided in the illustrative embodiments. It is detected that a first route and a second route are possible between two places. A first set of points of interest (POIs) is identified relative to the first route. By accessing a social media source, a set of social information is collected comprising information related to a POI. A subset of the social information is organized into a set of categories related to the POI. Each information in the (Continued)

subset is assigned a corresponding weight to compute a value for each information. A total value of each POI is determined using the computed values. From the first route and the second route, that route as presented as socially preferred route which has a higher total route value.

20 Claims, 6 Drawing Sheets

(56) References Cited

U.S. PATENT DOCUMENTS

| | | | | |
|---|---|---|---|---|
| 7,912,637 | B2* | 3/2011 | Horvitz | G01C 21/3476 701/33.4 |
| 8,401,786 | B2* | 3/2013 | Poppen | G01C 21/3476 340/438 |
| 8,909,469 | B2* | 12/2014 | Mizuno | G01C 21/3617 340/995.19 |
| 8,990,017 | B2* | 3/2015 | Schilling | G01C 21/34 701/527 |
| 9,008,888 | B1* | 4/2015 | Gravino | G01C 21/3476 701/26 |
| 9,037,397 | B2* | 5/2015 | Peri | G01C 21/3453 701/410 |
| 9,062,984 | B2* | 6/2015 | Wolf | G01C 21/3469 |
| 9,115,997 | B2* | 8/2015 | Poduri | G01C 21/00 |
| 9,146,129 | B1* | 9/2015 | Furio | G01C 21/3682 |
| 9,234,765 | B1* | 1/2016 | Padovitz | G01C 21/20 |
| 9,257,044 | B2* | 2/2016 | Boschker | G01C 21/3476 |
| 9,304,008 | B2* | 4/2016 | Poppen | G01C 21/3476 |
| 9,347,780 | B2* | 5/2016 | Caine | G01C 21/32 |
| 9,400,189 | B2* | 7/2016 | Beyeler | G01C 21/3682 |
| 9,417,069 | B2* | 8/2016 | Gupta | G01C 21/00 |
| 9,435,660 | B2* | 9/2016 | Nesbitt | G01C 21/3476 |
| 9,464,909 | B2* | 10/2016 | Chen | G01C 21/3605 |
| 9,476,724 | B2* | 10/2016 | Caine | G01C 21/3453 |
| 2002/0065604 | A1* | 5/2002 | Sekiyama | G01C 21/3476 701/426 |
| 2008/0104227 | A1 | 5/2008 | Birnie et al. | |
| 2008/0281516 | A1* | 11/2008 | Cummings | G01C 21/3476 701/414 |
| 2009/0005965 | A1* | 1/2009 | Forstall | G01C 21/3484 701/533 |
| 2009/0182498 | A1* | 7/2009 | Seymour | G01C 21/20 701/533 |
| 2009/0234574 | A1* | 9/2009 | Deng | G01C 21/3476 701/533 |
| 2010/0305855 | A1* | 12/2010 | Dutton | H04W 4/02 701/469 |
| 2011/0144903 | A1* | 6/2011 | Gupta | G01C 21/206 701/533 |
| 2012/0136865 | A1* | 5/2012 | Blom | G06F 17/30141 707/739 |
| 2012/0143491 | A1* | 6/2012 | Cheng | G01C 21/3476 701/410 |
| 2012/0271541 | A1 | 10/2012 | Hjelm et al. | |
| 2013/0325337 | A1 | 12/2013 | Rudenstine et al. | |
| 2014/0229107 | A1* | 8/2014 | Didjusto | G01C 21/00 701/537 |
| 2015/0051946 | A1* | 2/2015 | Galvin, Jr. | G06Q 30/0201 705/7.29 |
| 2015/0192419 | A1* | 7/2015 | Jiang | G01C 21/3682 701/408 |
| 2015/0204689 | A1* | 7/2015 | Aist | G01C 21/3679 701/400 |
| 2015/0226564 | A1* | 8/2015 | Nishida | G01C 21/3453 701/526 |
| 2015/0254291 | A1* | 9/2015 | Raikula | G06Q 50/01 707/741 |
| 2015/0285652 | A1* | 10/2015 | Peri | G01C 21/3476 701/438 |

OTHER PUBLICATIONS

IBM, WI—(Social Networking) Method for Collaborative Traveling, Mar. 6, 2010.
IBM, Personalized Navigation with Sharing Capabilities with Social Networks and Other Authorized Personnel, Mar. 5, 2009.

* cited by examiner

SOCIAL MEDIA BASED WEIGHTED ROUTE SELECTION

TECHNICAL FIELD

The present invention relates generally to a method, system, and computer program product for determining or selecting a route between two or more geographical locations. More particularly, the present invention relates to a method, system, and computer program product for social media based weighted route selection.

BACKGROUND

A variety of solutions exists today for finding routing or navigation information for traveling from one place to another. Some of these solutions use native mapping applications and map databases that are locally resident on a user's computer or device and can operate without access to a data network. Other routing solutions use mapping applications that communicate with a server over a data network to obtain the routing information.

Regardless of the type of routing solution, a presently available routing solution is capable of providing one or more route choices or routing options, given an origin and destination information. Many routing solutions compute the routes based on user's preferences such as the types of roads used in the route, toll usage, shortest time or distance preference, or routes formed by omitting prohibited areas. These map-specific preferences used in the prior art are hereinafter referred to as cartographic preferences.

Often, a presently available routing solution does not give the user routing choices, but chooses one or many possible routes based on the above-described cartographic preferences. Even if a routing solution were to present multiple routing choices to the user, the choices would only be selectable based on one or more of the above-described cartographic preferences.

SUMMARY

The illustrative embodiments provide a method, system, and computer program product for social media based weighted route selection. An embodiment includes a method for social media based weighted route selection. The embodiment detects, in an application using a processor and a memory, that a first route and a second route are possible between two places. The embodiment identifies, relative to the first route, a first set of points of interest (POIs). The embodiment collects, by accessing a social media source, a set of social information, wherein the set of social information comprises information related to a point of interest (POI) in the set of POIs, wherein the information is shared with the user in a social group at the social media source, wherein the user is a member of the social group. The embodiment organizes a subset of the set of social information into a set of categories related to the POI. The embodiment assigns each information in the subset of social information a corresponding weight to compute a value corresponding to each information. The embodiment determines, using the computed values, a total value of each POI in the first set of POIs. The embodiment presents, from the first route and the second route, that route as socially preferred route which has a higher total route value, a total route value of the first route comprising a sum of total values of each POI in the first set of POIs.

Another embodiment includes a computer program product for social media based weighted route selection. The embodiment further includes one or more computer-readable tangible storage devices. The embodiment further includes program instructions, stored on at least one of the one or more storage devices, to detect, in an application using a processor and a memory, that a first route and a second route are possible between two places. The embodiment further includes program instructions, stored on at least one of the one or more storage devices, to identify, relative to the first route, a first set of points of interest (POIs). The embodiment further includes program instructions, stored on at least one of the one or more storage devices, to collect, by accessing a social media source, a set of social information, wherein the set of social information comprises information related to a point of interest (POI) in the set of POIs, wherein the information is shared with the user in a social group at the social media source, wherein the user is a member of the social group. The embodiment further includes program instructions, stored on at least one of the one or more storage devices, to organize a subset of the set of social information into a set of categories related to the POI. The embodiment further includes program instructions, stored on at least one of the one or more storage devices, to assign each information in the subset of social information a corresponding weight to compute a value corresponding to each information. The embodiment further includes program instructions, stored on at least one of the one or more storage devices, to determine, using the computed values, a total value of each POI in the first set of POIs. The embodiment further includes program instructions, stored on at least one of the one or more storage devices, to present, from the first route and the second route, that route as socially preferred route which has a higher total route value, a total route value of the first route comprising a sum of total values of each POI in the first set of POIs.

Another embodiment includes a computer system for social media based weighted route selection. The embodiment further includes one or more processors, one or more computer-readable memories and one or more computer-readable storage devices. The embodiment further includes program instructions, stored on at least one of the one or more storage devices for execution by at least one of the one or more processors via at least one of the one or more memories, to detect, in an application using a processor and a memory, that a first route and a second route are possible between two places. The embodiment further includes program instructions, stored on at least one of the one or more storage devices for execution by at least one of the one or more processors via at least one of the one or more memories, to identify, relative to the first route, a first set of points of interest (POIs). The embodiment further includes program instructions, stored on at least one of the one or more storage devices for execution by at least one of the one or more processors via at least one of the one or more memories, to collect, by accessing a social media source, a set of social information, wherein the set of social information comprises information related to a point of interest (POI) in the set of POIs, wherein the information is shared with the user in a social group at the social media source, wherein the user is a member of the social group. The embodiment further includes program instructions, stored on at least one of the one or more storage devices for execution by at least one of the one or more processors via at least one of the one or more memories, to organize a subset of the set of social information into a set of categories related to the POI. The embodiment further includes program instructions, stored on at least one of the one or more storage devices for execution by at least one of the one or more processors via at least one of the one or more memories, to assign each information in the subset of social information a corresponding weight to compute a value corresponding to each information. The embodiment further includes program instructions, stored on at least one of the one or more storage devices for execution by at least one of the one or more processors via at least one of the one or more memories, to determine, using the computed values, a total value of each POI in the first set of POIs. The embodiment further includes program instructions, stored on at least one of the one or more storage devices for execution by at least one of the one or more processors via at least one of the one or more memories, to present, from the first route and the second route, that route as socially preferred route which has a higher total route value, a total route value of the first route comprising a sum of total values of each POI in the first set of POIs.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
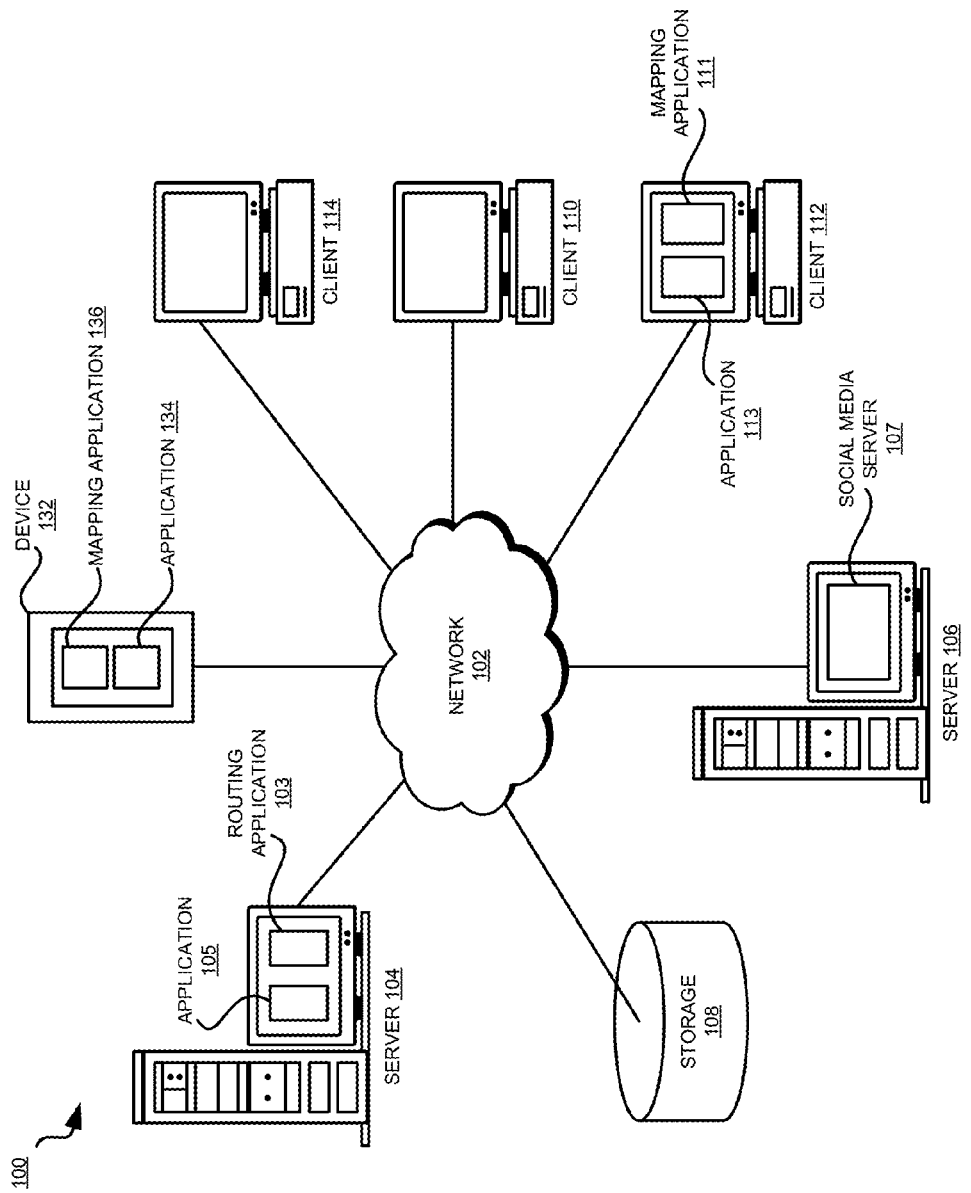
FIG. 1 depicts a block diagram of a network of data processing systems in which illustrative embodiments may be implemented.

The illustrative embodiments recognize that the presently available routing solutions do not allow the user to leverage user's social network in route selection. For example, the illustrative embodiments recognize that users often value the opinions of their acquaintances more than or at least comparable to information available from strangers or websites. The illustrative embodiments also recognize that people of similar tastes, interests, and choices often group together on social networks and social media sites (collectively and interchangeably hereinafter "social media" or "social network").

Thus, the illustrative embodiments recognize that when a user is planning to travel or to undertake a journey using a route, the user might want to incorporate into the planning pertinent information about the route that might be available to the user from the user's social network. For example, one or more friends in the user's social network may have opinions, critique, thoughts, suggestions, recommendations, comments, pictures, videos, and other similar information about the places the user is likely to come across or pass-through on a route (collectively hereinafter, "social information").

Furthermore, the illustrative embodiments recognize that social information may be available from a social network or a similarly selected source about all or a part of a route. Additionally, more than one social network may provide social information about a portion of a route.

For example, if the user is planning a trip between Dusseldorf, Germany, and Paris, France, the user might have members of the user's social network who may have made all or part of the same journey using all or part of the route proposed by a prior-art routing solution. For example, some members might be a part of the user's foodie social network, some members might be a part of the user's outdoors adventures social network, others may be members with friends with broader similar interests, and so on. The members of the foodie social network may have pictures, comments, notes, critique, suggestions, and the like about restaurants and bistros along a route. The members of the outdoors adventures might have pictures and comments from a hiking trip at, from, to, or near a place on the route. A friend might have children, like the user, and may have advice about children-specific stops along the route from personal experience.

The illustrative embodiments recognize that this type of social information is important in route planning. Furthermore, depending upon the social information is available for a routing choice and other factors, the user's route selection might be swayed in favor of a different route choice than the route selected by a prior-art routing solution.

The illustrative embodiments used to describe the invention generally address and solve the above-described problems and other problems related to selecting a route between two or more places. The illustrative embodiments provide a method, system, and computer program product for social media based weighted route selection.

Many social information factors about places or points of interests (collectively "point(s) of interest" or "POI(s)") on a route can affect a user's route selection. Some example factors related to social information about POIs include but are not limited to an amount of the social information available for POIs on a route, type of the social information, quality of the social information, relevance or weight of that social information to a user's purpose or objective for using that route, static or transient nature of the social information, age of the social information, and so on. From this disclosure, those of ordinary skill in the art will be able to conceive many other factors associated with social information about POIs on a route, and the same are contemplated within the scope of the illustrative embodiments.

An embodiment for social media based weighted route selection can be implemented as an application to execute in a data processing system. Some embodiments are configurable for executing in an application at a data processing system that operates a routing application as a server, to receive routing requests from client data processing systems over a data network. Some other embodiments are configurable for executing in an application at a data processing system that operates a mapping application as a client, and sends routing requests to a server data processing system over a data network.

Some other embodiments are configurable for executing in an application at a data processing system that operates a native mapping application without requiring a data network and without making routing requests to a server over a data network. In some cases, an embodiment can be partially implemented at a server as a first application, and partially at a client as a second application, the two applications operating in conjunction to provide a functionality described herein. Whether or not a prior-art routing application or mapping application operating in conjunction with an embodiment requires a data network, the embodiment uses a data network to obtain social information as described herein.

An embodiment detects that a route either has been, or is ready to be presented to the user, such as from a prior-art routing solution. The embodiment identifies a set of POIs along the presented route.

The embodiment searches social media used by the user for information about the POIs. For example, given a user's social groups at a particular social media site, the embodiment searches the information that is shared with the user in those social groups and is related to one or more POIs on the route, the route as a whole, a starting point or a destination on the route, or a combination thereof. The embodiment collects such social information.

An embodiment uses a hierarchy to organize the social information collected about POIs. For example, a place has several categories of things, experiences, or activities to offer. A category, e.g., a category of activities includes several specific activities. In other words, the hierarchy to organize the collected social information, in its simplest form, has the place at the root node, with categories of information as children nodes of the root node, and specific social information about that place within a category forming a leaf node under a particular category node.

This simple example of a hierarchy is only used to describe certain operations of certain embodiments. The above-described simple hierarchy is not intended to be limiting on the illustrative embodiments. From this disclosure, those of ordinary skill in the art will be able to conceive other hierarchies for organizing the social information collected by an embodiment and the same are contemplated within the scope of the illustrative embodiments.

Any number and type of specific social information can be organized under the root node or an intermediate parent node. For example, a picture from a friend of a museum exhibit at a POI and a comment from a fellow hiker about a waterfall close to the POI can both be specific social information under the root node of the place of the POI. However the picture and the comment may be categorized commonly or differently depending upon the categories formed or selected by the user. For example, in one instance, the picture might be commonly categorized under a category called "activities". In another instance, the picture might be categorized under a category called "art" and the comment might be categorized under another category called "outdoors".

An album is a collection of specific social information. An album about a category at a place includes at least some specific social information that has been organized by an embodiment under that category for that place. An album about a place includes all albums about all categories under that place that are populated with at least some specific social information. Essentially, an album at a parent node in a hierarchy includes all albums that include at least some specific social information and are associated with a child node thereunder.

Accordingly, a place or a category or sub-category thereunder can have zero, one, or more than one albums associated therewith. An embodiment associates an album with a POI on the route. An album can include any type and number of social information, such as, but not limited to, pictures, audio files, video files, and textual content.

A user may have certain preferences other than cartographic preferences. For example, the user may be interested in museums more than outdoors activities, and may not be interested in children's activities at all. Furthermore, depending upon an objective of the trip for which the route is going to be used, the user might be interested in different things during different instances of the same route. Similarly, different users might be interested in different things on the same route.

Therefore, an embodiment allows a user to configure how the albums are created, and how the albums affects the desirability of a particular route give a plurality of possible routes. A weight is a measure of relevance of a given information to an objective or preference. For example, a business user's highest concern about a POI on a route is the availability of good hotels, and followed by availability of desirable food choices, and not at all about the available child-care options to athletic options. A family planning a vacation trip probably would rank children's activities the highest, food and accommodations next, and historical sites last.

Using an embodiment, a user can overtly or impliedly indicate a purpose or objective for which the route is going to be used. For example, the user can select a preference level for certain categories of information about the POI on a scale. The embodiment converts the selected preference level to a weight that is associated with those categories. Similarly, the user can indicate or configure relative preferences for certain categories of social information (social preferences).

An embodiment can further automatically adjust certain weights based on the circumstances of the proposed travel. For example, depending upon a time of travel, some categories of social information might not be useful to the user even if the user is interested in those categories.

As an example, if the user is to pass through a POI at midnight or on a government holiday, a particular museum might not be open even if the user is otherwise interested in museums. As another example, even if the user is interested in music concerts, a social information about a past concert at a POI is unlikely to be useful to the user.

Accordingly, an embodiment can automatically adjust a weight, by increasing or decreasing the user-assigned weight, to accommodate conditions of travel, expected circumstances, static or temporary nature of certain specific social information, and other similarly purposed considerations.

Generally, within the scope of the illustrative embodiments, a weight can be associated with any node on the hierarchy in which the collected social information is organized. For example, a weight can be associated with a POI, a category, or a specific type of social information. For example, the user may prefer social information with pictures to textual social information.

Once the weighting is available for certain POIs, categories, or types of specific social information, an embodiment computes a total weight of an album. For example, suppose a given instance of social information is an image, audio, or video information. This type of information, and even some textual comments, has metadata that is descriptive of a location where the information was captured or entered, and what the information describes. An embodiment parses the metadata to identify a location, content significance, age, relevance to a category, and other similarly purposed information usable for categorizing the given social information. The embodiment uses the parsed information to categorize the given social information.

As another example, suppose a given instance of social information is textual data, or another type of data without metadata that is usable in the above-described fashion. An embodiment uses Natural Language Processing (NLP), image recognition, and other known techniques to identify a location, content significance, age, and relevance to a category, and other similarly purposed information usable for categorizing the given social information. The embodiment uses the parsed information to categorize the given social information.

Knowing the weights of each album associated with a node in the hierarchy, the embodiment computes the total weight of all albums associated with a node in the hierarchy, and regards the total weight as a weight of that node. For example, if a category of social information has two albums with weights 10 and 12 associated therewith, the embodiment computes the weight of the category as 22, given the specific social information collected from the user's social media groups. Likewise, if a POI has three categories with weights 9, 13, and 17 associated therewith, the weight of the POI becomes 39.

The combined weight of all POIs is an indication of the volume of relevant social information available in relation with each route choice the user has. For example, suppose that routes A and B are two alternative routes available between the user's selected origin and destination. A prior art routing solution may indicate that route A is shorter than route B according to the user's cartographic preferences. In contrast, an embodiment informs the user that route A has a total weight of 53 whereas route B has a total weight of 89 according to the user's social preferences because route B has more relevant social information at the POIs on route B as compared to route A.

A method of an embodiment described herein, when implemented to execute on a device or data processing system, comprises substantial advancement of the functionality of that device or data processing system in social media based weighted route selection. For example, where prior-art fails to recognize the user's social preferences and reliance on social information in route selection, an embodiment incorporates the user's social preferences and social information into the route selection process. Operating in a manner described herein, an embodiment allows a user a choice of route that better fits the user's purpose, likes or dislikes, circumstances, or expectations from a trip as compared to a route selected by a prior-art routing solution based only on cartographic preferences. Such manner of route selection is unavailable in presently available devices or data processing systems. Thus, a substantial advancement of such devices or data processing systems by executing a method of an embodiment improves the usefulness and pertinence of route selection in a context contemplated by the user.

The illustrative embodiments are described with respect to certain solutions, routes, social media, preferences, categories, hierarchies, weights, values, calculations, metadata, parsing or information extraction techniques, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
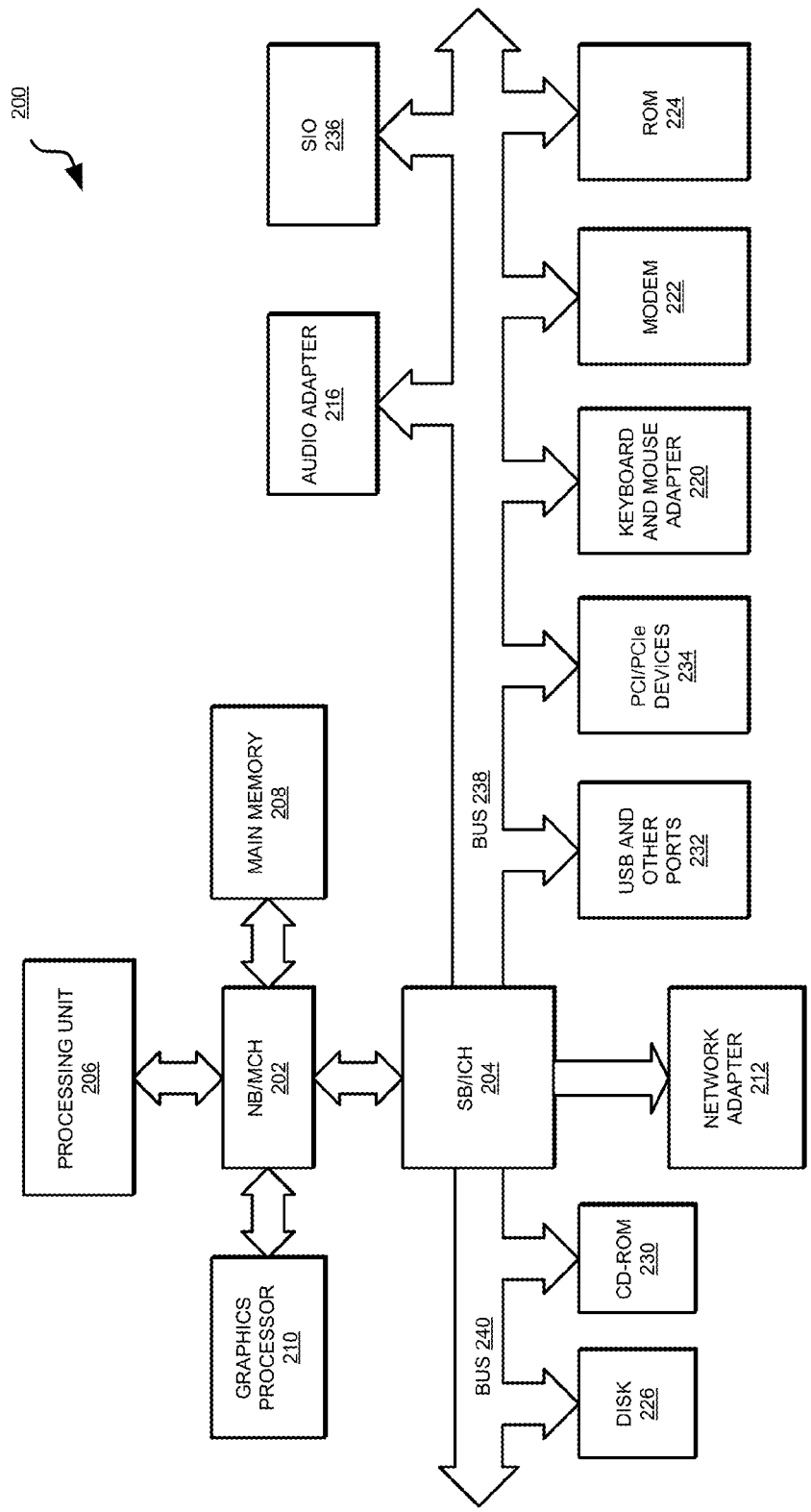
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device that can be configured for requesting entity reviews and analysis reports. Mapping application 136 is an example client-side application capable of communicating with one or more routing applications on a server, such as routing application 103 in server 104. Mapping application 111 may be a native mapping application and operates in conjunction with application 113 on client 112 as described herein. Routing application 103 on server 104 operates to receive routing requests, such as from mapping application 136, and to respond to such requests with one or more rout choices, such as by sending routing information to mapping application 136. Application 105 implements certain embodiments that can be configured to operate on server-side, such as to operate in conjunction with routing application 103 on server 104. Social media server 107 on server 106 is an example social media site from which application 134 or 113 can collect specific social information as described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105, application 113, or application 134 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
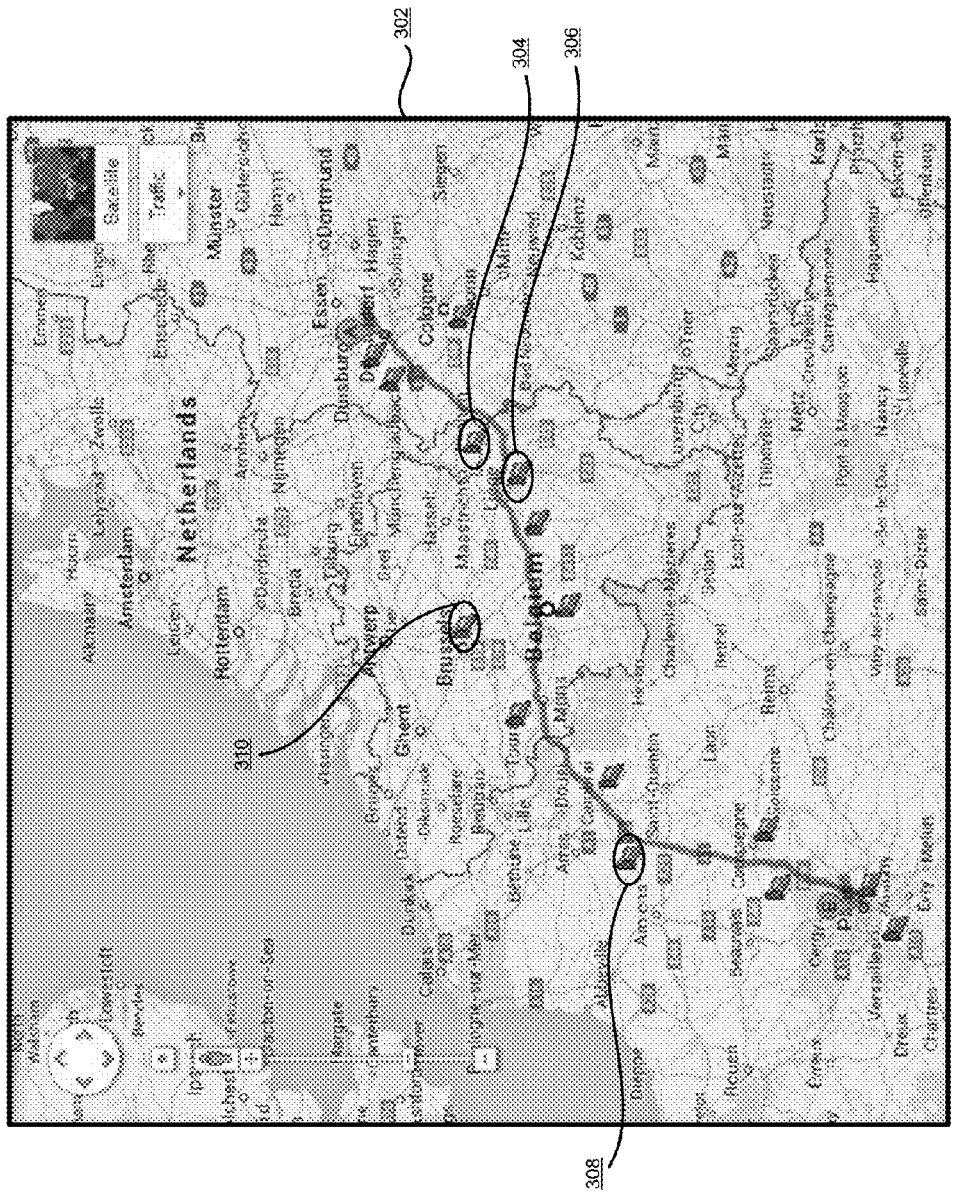
FIG. 3 depicts a map with an example social media based weighted route selection in accordance with an illustrative embodiment.

With reference to FIG. 3, this figure depicts a map with an example social media based weighted route selection in accordance with an illustrative embodiment. Map 302 and route 304 thereon are presented using mapping application 111 or 136 in FIG. 1.

An embodiment executing in application 113 or 134, respectively, in FIG. 1, selects a set of POIs along route 304. POIs 306 and 308 are two examples of the selected POIs.

A marker, e.g., a graphical icon depicts the POIs on route 304. For example, the album-shaped icons at POIs 306 and 308, and other such POIs along route 304, indicate to the user that a set of one or more albums is associated with those POIs.

When selecting the POIs along route 304, an embodiment considers not only the places through which route 304 passes, such as POIs 306 and 308, but also POIs that are proximate to route 304, e.g., POI 310. An embodiment selects an off-route POI, such as POI 310, by searching for places that are within a defined distance from route 304 and for which social information relevant to a user's travel is available from the user's social media.

For example, the embodiment selects an arbitrary area around route 304, such as the entirety of map 302, finds all POIs in that area, searches the user's social media for relevant social information about those POIs, and shortlists those POIs that are within a distance-from-route threshold and have relevant social information available. The embodiment removes the other non-shortlisted off-route POIs from consideration, and presents the shortlisted off-route POIs on map 302 proximate to route 304 with a marker and a corresponding set of album.

Figure 4:
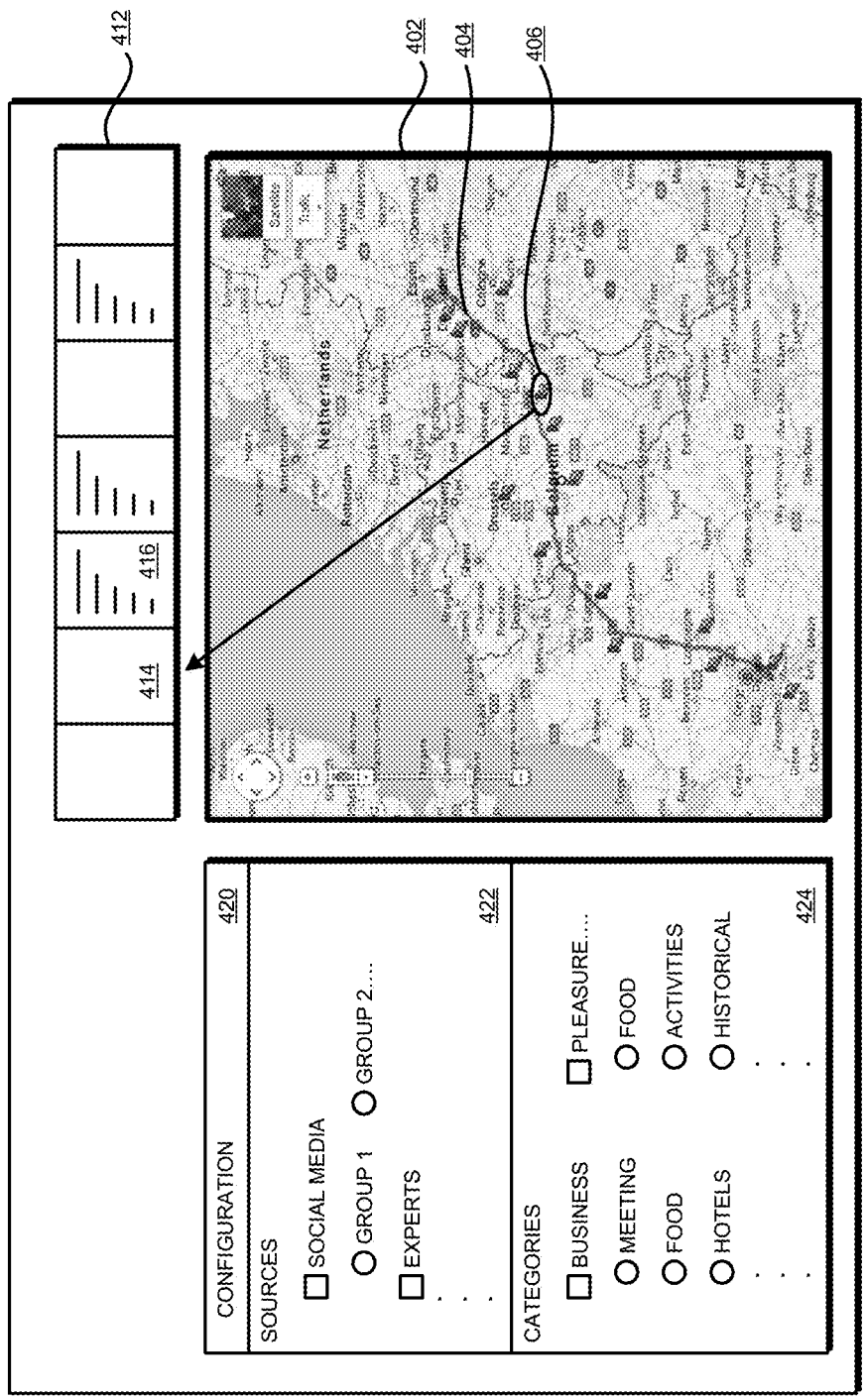
FIG. 4 depicts a manner of presenting an album of relevant social information related to a POI in accordance with an illustrative embodiment.

With reference to FIG. 4, this figure depicts a manner of presenting an album of relevant social information related to a POI in accordance with an illustrative embodiment. Map 402 and route 404 are examples of map 302 and route 304, respectively, in FIG. 3.

A graphical marker or other comparably usable artifact at POI 406 allows the user to access an album of relevant social information about the POI collected from the user's social media. For example, when the user clicks the graphical marker, or otherwise interacts with a comparable artifact at POI, an application implementing an embodiment presents the user with view 412 of an album of the POI.

Album 412 can include any number and type of information. For example, social information 414 may be an image, a photograph, a graphic, an audio file, or a video file. As another example, social information 416 may be textual comment, an image containing text, or a link to a resource on a network.

In one embodiment, view 412 combines the contents of several albums. The embodiment then presents view 412, which can include social content in a variety of categories. For example, one embodiment visibly delimits one category from another category in view 412 when social information from multiple categories is presented in view 412.

Another example embodiment allows a user to select a category within view 412, such as from a category selection mechanism (not shown), and modifies view 412 to present the social information in the selected category. In another embodiment, view 412 includes social information from a single album and allows the user to step through, switch to, or otherwise navigate to other albums.

The example manners of presenting view 412 are not intended to be limiting on the illustrative embodiments. From this disclosure, those of ordinary skill in the art will be able to conceive many other ways of presenting albums of social information from the user's own trusted social groups, and the same are contemplated within the scope of the illustrative embodiments.

User interface (UI) 420, presented by an embodiment, allows the embodiment to determine user's social preferences. For example, block 422 allows the user to select one or more social media sources, social groups therein, or a combination thereof, from which to collect the social information. The social information collected about a POI from the selected social media sources is then organized, categorized, weighted, and presented as album, such as album 412 of POI 406.

Similarly, block 424 allows a user to indicate an objective of the trip planned with route 404, e.g., whether the trip is for business or pleasure. Furthermore, block 424 allows the user to specify the categories of social information in which the user is interested.

Note that more than one objectives are selectable and more than one categories under one or more objectives are also selectable. Furthermore, an overt selection of some example trip objectives is depicted only for clarity and not as a requirement of an embodiment. An implementation of block 424 may omit the selection methods for selecting trip objectives.

Additionally, the categories depicted in block 424 are only non-limiting examples used for the clarity of the description and not to imply a limitation on the illustrative embodiments. Categories depicted in an implementation of block 424 can be default categories adopted by an application implementing an embodiment, categories previously configured in the application by the user, categories defined at the time of determining route 404 or thereafter, or a combination thereof.

The particular depiction of UI 420 is also not intended to be limiting on the illustrative embodiments. The purpose of UI 420—to provide the user a way to specify or indicate certain choices and social preferences—can be implemented in any suitable manner without departing the scope of the illustrative embodiments.

Figure 5:
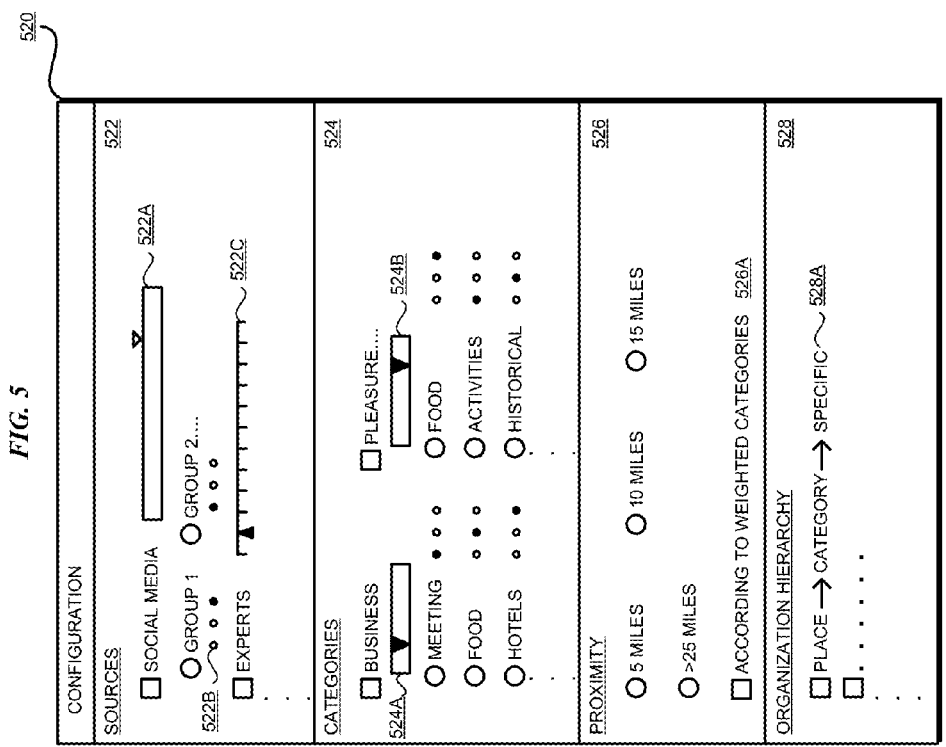
FIG. 5 depicts a block diagram of another example manner of collecting a user's social preferences and choices in accordance with an illustrative embodiment.

With reference to FIG. 5, this figure depicts a block diagram of another example manner of collecting a user's social preferences and choices in accordance with an illustrative embodiment. UI 520 is an example of UI 420 in FIG. 4.

As described elsewhere in this disclosure, a user can indicate a relative liking or disliking, relative desirability or undesirability, relative importance or unimportance, and other similarly purposed relative valuations amongst the selections that the user indicates as the user's social preferences. Such valuations of the selected social preferences are relative to one another. For example, when a user indicates that the user likes the information on museums to a certain level of liking, the user is indicating that the user's liking for that information is relative to another type or category of information, e.g., information about food, which the user may like more than or less than the information about museums.

Only as an example, and not to imply any limitation thereto, the relative value, preference, or weight of a selection on UI 520 can be implemented using one or more of a variety of scale mechanisms. For example, in block 522, the user can indicate the relative credibility, trust, or liking that the user places in one particular source of social information over another source of social information.

As in the depicted example, a value that the user places in a particular social media in block 522 can be selected using scale 522A, which is depicted as a sliding scale mechanism of one type. Within the social media, the user may weigh the social information from different social groups differently. Accordingly, an embodiment can present the user with scale mechanisms, such as scale mechanism 522B in the example form of radio button control, in conjunction with the various groups that the embodiment discovers in the user's social media.

Similarly, a value that the user places in another social media, e.g., a social network of experts of which the user is a member, in block 522 can be selected using scale 522C, which is depicted as a sliding scale mechanism of another type. Any number or types of social media, and groupings therein, can be relatively indicated in a similar manner.

Note that different types of scale mechanisms are depicted in UI 520 to illustrate a small sampling of the variety of scale mechanisms available for such purposes. Consistent use of a particular type of scale mechanism is contemplated within the scope of the illustrative embodiments.

Relative indication of objectives can similarly be indicated in block 524. For example, the user may use slider 524A to indicate that business is a secondary objective of the trip and use slider 524B to indicate that pleasure is the primary objective, or a more important objective. Any number or types of objectives can be relatively indicated in a similar manner.

The user can also indicate relative importance of certain categories in a similar manner, whether or not the categories are identified with any particular objectives as depicted in FIG. 5. For example, as depicted, the user indicates that for business purposes, the user is most interested in information about meeting places, then food options, and least in information about hotels. The user can further indicate that for pleasure purposes, the user is most interested in information about activities, then historical sites, and least in information about food options.

Many such social preferences are configurable in UI 520. As another example social preference is the user's desire to drive off-route to visit a POI if the POI has something that interests the user. Proximity configuration in block 526 allows the user to define how far the user is willing to go off-route for such POIs. In some cases, the distance options can be more sophisticated. For example, an implementation of control 526A can allow the user to specify that the farther the distance of an off-route POI is from the route, the higher should be the category of the attraction or the weight of the social information about the attraction at the POI.

UI 520 can be configured to allow a user to specify the hierarchy or order in which the collected social information should be organized. In one embodiment, block 528 presents the user with various alternative hierarchies, such as hierarchy 528A and others, from which the user can chose a hierarchy that best fits the user's social preferences for the trip.

Blocks 522-528 are selected and depicted in a particular manner only as non-limiting examples. Any number of configurable social preferences and their relative valuations can be presented in any suitable manner without departing from the scope of the illustrative embodiments.

Figure 6:
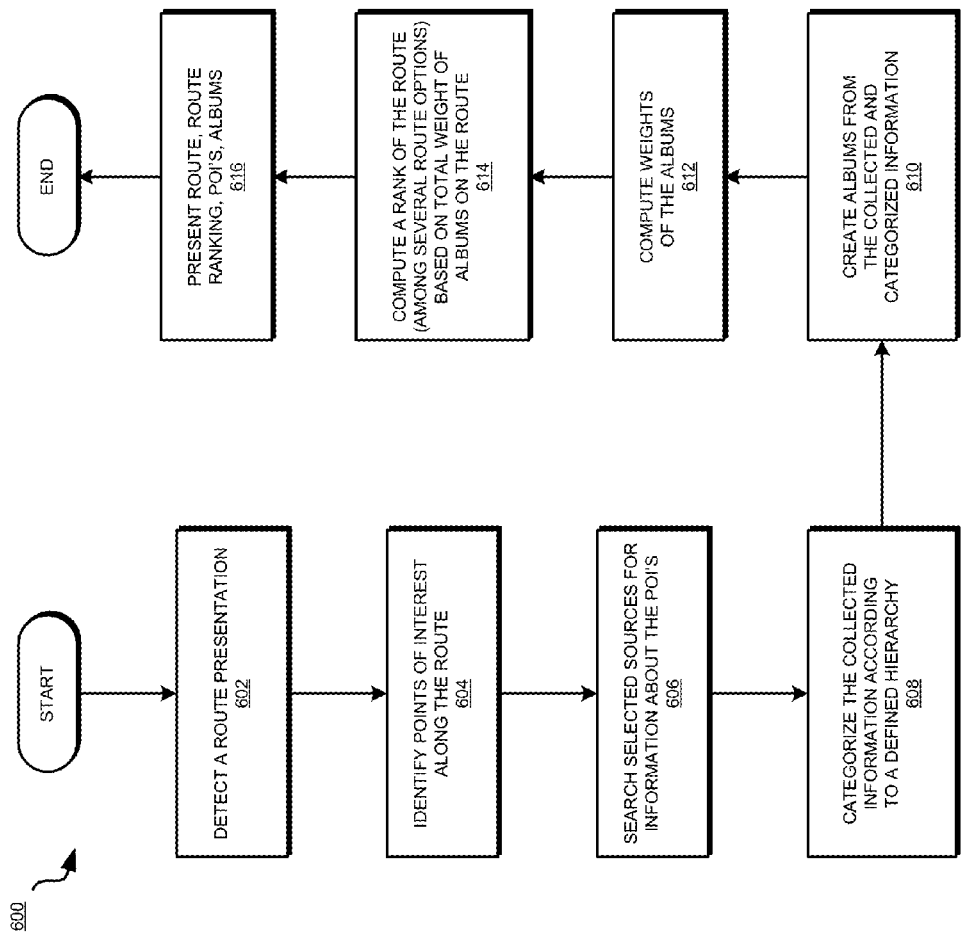
FIG. 6 depicts a flowchart of an example process for social media based weighted route selection in accordance with an illustrative embodiment.

With reference to FIG. 6, this figure depicts a flowchart of an example process for social media based weighted route selection in accordance with an illustrative embodiment. Process 600 can be implemented in application 113, 134, or 105 in FIG. 1.

The application detects that one or more routes are being presented as a routing choice to a user (block 602). The application identifies a set of points of interest along a route (block 604). The application searches a selected set of social media sources for socially shared information about the POIs in the set (block 606).

The application categorizes the collected social information according to a defined hierarchy (block 608). The application creates one or more albums for the categorized information (block 610). The application computes the weights of each such album (block 612).

When multiple routes are being presented or are possible, the application repeats blocks 602-610 for each such route. The application computes a rank of each route option based on a total weight of the albums for the POIs on or off the route (block 614). The route with the highest total weight ranks the highest, and the route with the lowest total weight ranks the lowest, other routes with intermediate weights ranked in between, accordingly.

The application presents the routes, route rankings, POIs, and the associated albums to the user (block 616). The application ends process 600 thereafter.

Thus, a computer implemented method, system or apparatus, and computer program product are provided in the illustrative embodiments for social media based weighted route selection. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for social media based weighted route selection, the method comprising:
   computing, in an application using a processor and a memory, by performing map data analysis, a first route and a second route each of the first route and the second route being possible between two places;
   identifying, relative to the first route, a first set of points of interest (POIs);
   searching a social media source associated with a user for social information related to a first point of interest (POI) and social information related to a second POI, the first set of POIs including the first POI and the second POI, and wherein the first POI and the second POI are both within a threshold distance from the first route;
   removing the second POI from the set of POIs responsive to social information related to the second POI being unavailable in the social media source associated with the user;
   collecting, responsive to the searching the social media source associated with a user, a set of social information, wherein the set of social information comprises information related to the first POI, wherein the information related to the first POI is shared with the user in a social group at the social media source, wherein the user is a member of the social group;
   distributing a subset of the set of social information into a set of categories related to the first POI;
   assigning each information in the subset of social information a corresponding weight;
   computing, using the weight, a value corresponding to the each information;
   determining, using the computed values, a total value of each POI in the first set of POIs; and
   presenting, from the first route and the second route, that route as socially preferred route which has a higher total route value, a total route value of the first route comprising a sum of total values of each POI in the first set of POIs.

2. The method of claim 1, further comprising:
   computing a first total value of the first POI in the first set of POIs by computing a sum of each total value of each category associated with the first POI; and
   computing a total value of a first category associated with the first POI by computing a total value of all information in a first subset of the set of social information associated with the first category.

3. The method of claim 1, further comprising:
   receiving, from the user, a source weight for the social group, wherein the source weight for the social group is different from a second source weight for a second social group in a second social media source, the user further being a member of the second social group; and
   attributing, as a part of the assigning, the source weight to each information from the subset of social information that is received from another member of the social group.

4. The method of claim 1, further comprising:
   receiving, from the user, a first category weight for a first category in the set of categories, the first category weight indicating a relative importance of the first category over a second category in the set of categories; and
   attributing, as a part of the assigning, the first category weight to each information from the subset of social information that is categorized in the first category.

5. The method of claim 1, further comprising:
   receiving, from a user, a definition of a category in the set of categories.

6. The method of claim 5, wherein the definition of the category is applicable to the first and the second routes only.

7. The method of claim 1, further comprising:
   parsing a metadata of a specific social information in the subset of social information, wherein the parsing provides a location information usable to associate the specific social information with the first POI, and wherein the parsing provides a subject information usable to categorize the specific social information in a category from the set of categories.

8. The method of claim 1, further comprising:
   processing, using Natural Language Processing (NLP), a content of a specific social information in the subset of social information, wherein the processing provides a location information usable to associate the specific social information with the first POI, and wherein the processing provides a subject information usable to categorize the specific social information in a category from the set of categories.

9. The method of claim 1, further comprising:
   processing, using image recognition, a content of a specific social information in the subset of social information, wherein the processing provides a location information usable to associate the specific social information with the first POI, and wherein the processing provides a subject information usable to categorize the specific social information in a category from the set of categories.

10. The method of claim 1, further comprising:
    presenting the subset of the set of social information as an album associated with the POI.

11. The method of claim 1, wherein the first POI in the first set of POIs is separated from the first route by a first distance.

12. The method of claim 11, further comprising:
    selecting the first POI such that the distance of the first POI from the first route is proportional to a total weight associated with all social information related to the first POI.

13. The method of claim 1, wherein the method is embodied in a computer program product comprising one or more computer-readable tangible storage devices and computer-readable program instructions which are stored on the one or more computer-readable tangible storage devices and executed by one or more processors.

14. The method of claim 1, wherein the method is embodied in a computer system comprising one or more processors, one or more computer-readable memories, one or more computer-readable tangible storage devices and program instructions which are stored on the one or more computer-readable tangible storage devices for execution by the one or more processors via the one or more memories and executed by the one or more processors.

15. A computer program product for social media based weighted route selection, the computer program product comprising:
   one or more computer-readable tangible storage devices;
   program instructions, stored on at least one of the one or more storage devices, to compute, in an application using a processor and a memory, by performing map data analysis, a first route and a second route each of the first route and the second route being possible between two places;
   program instructions, stored on at least one of the one or more storage devices, to identify, relative to the first route, a first set of points of interest (POIs);
   program instructions, stored on at least one of the one or more storage devices, to search a social media source associated with a user for social information related to a first point of interest (POI) and social information related to a second POI, the first set of POIs including the first POI and the second POI, and wherein the first POI and the second POI are both within a threshold distance from the first route;
   program instructions, stored on at least one of the one or more storage devices, to remove the second POI from the set of POIs responsive to social information related to the second POI being unavailable in the social media source associated with the user;
   program instructions, stored on at least one of the one or more storage devices, to collect, responsive to the searching the social media source associated with a user, a set of social information, wherein the set of social information comprises information related to the first POI, wherein the information related to the first POI is shared with the user in a social group at the social media source, wherein the user is a member of the social group;
   program instructions, stored on at least one of the one or more storage devices, to distribute a subset of the set of social information into a set of categories related to the POI;
   program instructions, stored on at least one of the one or more storage devices, to assign each information in the subset of social information a corresponding weight;
   program instructions, stored on at least one of the one or more storage devices, to compute, using the weight, a value corresponding to the each information;
   program instructions, stored on at least one of the one or more storage devices, to determine, using the computed values, a total value of each POI in the first set of POIs; and
   program instructions, stored on at least one of the one or more storage devices, to present, from the first route and the second route, that route as socially preferred route which has a higher total route value, a total route value of the first route comprising a sum of total values of each POI in the first set of POIs.

16. The computer program product of claim 15, further comprising:
   program instructions, stored on at least one of the one or more storage devices, to compute a first total value of the first POI in the first set of POIs by computing a sum of each total value of each category associated with the first POI; and
   program instructions, stored on at least one of the one or more storage devices, to compute a total value of a first category associated with the first POI by computing a total value of all information in a first subset of the set of social information associated with the first category.

17. The computer program product of claim 15, further comprising:
   program instructions, stored on at least one of the one or more storage devices, to receive, from the user, a source weight for the social group, wherein the source weight for the social group is different from a second source weight for a second social group in a second social media source, the user further being a member of the second social group; and
   program instructions, stored on at least one of the one or more storage devices, to attribute, as a part of the assigning, the source weight to each information from the subset of social information that is received from another member of the social group.

18. The computer program product of claim 15, further comprising:
   program instructions, stored on at least one of the one or more storage devices, to receive, from the user, a first category weight for a first category in the set of categories, the first category weight indicating a relative importance of the first category over a second category in the set of categories; and
   program instructions, stored on at least one of the one or more storage devices, to attribute, as a part of the assigning, the first category weight to each information from the subset of social information that is categorized in the first category.

19. The computer program product of claim 15, further comprising:
   program instructions, stored on at least one of the one or more storage devices, to receive, from a user, a definition of a category in the set of categories.

20. A computer system for social media based weighted route selection, the computer system comprising:
   one or more processors, one or more computer-readable memories and one or more computer-readable storage devices;
   program instructions, stored on at least one of the one or more storage devices for execution by at least one of the one or more processors via at least one of the one or more memories, to compute, in an application, by performing map data analysis, a first route and a second route each of the first route and the second route being possible between two places;
   program instructions, stored on at least one of the one or more storage devices for execution by at least one of the one or more processors via at least one of the one or more memories, to identify, relative to the first route, a first set of points of interest (POIs);
   program instructions, stored on at least one of the one or more storage devices for execution by at least one of the one or more processors via at least one of the one or more memories, to search a social media source associated with a user for social information related to a first point of interest (POI) and social information related to a second POI, the first set of POIs including the first POI and the second POI, and wherein the first POI and the second POI are both within a threshold distance from the first route;

program instructions, stored on at least one of the one or more storage devices for execution by at least one of the one or more processors via at least one of the one or more memories, to remove the second POI from the set of POIs responsive to social information related to the second POI being unavailable in the social media source associated with the user;

program instructions, stored on at least one of the one or more storage devices for execution by at least one of the one or more processors via at least one of the one or more memories, to collect, responsive to the searching the social media source associated with a user, a set of social information, wherein the set of social information comprises information related to the first POI, wherein the information related to the first POI is shared with the user in a social group at the social media source, wherein the user is a member of the social group;

program instructions, stored on at least one of the one or more storage devices for execution by at least one of the one or more processors via at least one of the one or more memories, to distribute a subset of the set of social information into a set of categories related to the POI;

program instructions, stored on at least one of the one or more storage devices for execution by at least one of the one or more processors via at least one of the one or more memories, to assign each information in the subset of social information a corresponding weight;

program instructions, stored on at least one of the one or more storage devices for execution by at least one of the one or more processors via at least one of the one or more memories, to compute, using the weight, a value corresponding to the each information;

program instructions, stored on at least one of the one or more storage devices for execution by at least one of the one or more processors via at least one of the one or more memories, to determine, using the computed values, a total value of each POI in the first set of POIs; and program instructions, stored on at least one of the one or more storage devices for execution by at least one of the one or more processors via at least one of the one or more memories, to present, from the first route and the second route, that route as socially preferred route which has a higher total route value, a total route value of the first route comprising a sum of total values of each POI in the first set of POIs.

* * * * *